(12) United States Patent
Singh et al.

(10) Patent No.: US 9,176,850 B2
(45) Date of Patent: *Nov. 3, 2015

(54) AUTOMATED PARALLEL SOFTWARE CODE IMPACT ANALYSIS

(71) Applicant: JUNIPER NETWORKS, INC., Sunnyvale, CA (US)

(72) Inventors: Abhishek Singh, Bangalore (IN); Sachin Vasudeva, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 14/194,080

(22) Filed: Feb. 28, 2014

(65) Prior Publication Data

US 2014/0181796 A1     Jun. 26, 2014

Related U.S. Application Data

(63) Continuation of application No. 12/914,532, filed on Oct. 28, 2010, now Pat. No. 8,683,449.

(51) Int. Cl.
*G06F 9/44* (2006.01)
*G06F 11/36* (2006.01)

(52) U.S. Cl.
CPC .............. *G06F 11/3668* (2013.01); *G06F 8/75* (2013.01); *G06F 11/3604* (2013.01); *G06F 11/368* (2013.01)

(58) Field of Classification Search
CPC ......... G06F 8/71; G06F 8/75; G06F 11/3604; G06F 11/368

USPC ........................................................ 717/133
See application file for complete search history.

(56) References Cited

U.S. PATENT DOCUMENTS

| 7,720,872 | B1 * | 5/2010 | Biere et al. ..................... 707/802 |
| 8,276,123 | B1 * | 9/2012 | Deng ..................... G06F 11/368 714/37 |
| 2003/0018957 | A1 | 1/2003 | Bates et al. |
| 2003/0084425 | A1 | 5/2003 | Glaser |

(Continued)

OTHER PUBLICATIONS

Tonella, "Using a concept lattice of decomposition slices for program understanding and impact analysis," Feb. 2003, pp. 495-509.

(Continued)

*Primary Examiner* — Duy Khuong Nguyen
(74) *Attorney, Agent, or Firm* — Harrity & Harrity, LLP

(57) ABSTRACT

A server device is configured to receive a request to identify a manner in which changed code propagates within an application; generate a group of blocks that correspond to code associated with a parent function corresponding to the application and which includes the changed code; perform an intra-procedural analysis on the group of blocks to identify a block that is affected by the changed code included within an epicenter block; perform an inter-procedural analysis on functions associated with the block, where, when performing the inter-procedural analysis, the server device is to generate another group of blocks associated with the functions, and identify another block that is affected by the changed code included within the epicenter block; and present, for display, information associated with the block or the other block that enables the application to be tested based on the block or the other block.

20 Claims, 7 Drawing Sheets

(56) References Cited

U.S. PATENT DOCUMENTS

2005/0060696 A1  3/2005  Bicsak et al.
2012/0110557 A1  5/2012  Singh et al.

OTHER PUBLICATIONS

S. S. Yau et al., "Ripple Effect Analysis of Software Maintenance," Department of Electrical Engineering and Computer Science, Northwestern University, IEEE—1978, pp. 60-65.
Sebastian Danicic et al., "A Parallel Algorithm for Static Program Slicing," University of North London, 1995, 22 pages.
Frank Tip, "A Survey of Program Slicing Techniques," Journal of Programming Languages, 1995, 65 pages.
Mark Weiser, "Program Slicing," Computer Science Department, Conference on Software Engineering, University of Maryland, IEEE—1981, pp. 439-449.
Susan Horwitz et al., "Interprocedural Slicing Using Dependence Graphs," ACM Transactions of Programming Languages and Systems—1990, 3 pages.
Keith Brian Gallagher et al., "Using Program Slicing in Software Maintenance," IEEE Transactions on Software Engineering, vol. 17, No. 8, Aug. 1991, pp. 751-761.
C. M. Overstreet et al., "Using Bidirectional Data Flow Analysis to Support Software Reuse," Computer Science Department, Old Dominion University, Jan. 31, 1994, 14 pages.
Yamin Wang et al., "The Role of Program Slicing in Ripple Effect Analysis," Department of Computer Science, University of Minnesota, 1996, 21 pages.
Alfred V. Aho et al., "Compilers—Principles, Techniques, and Tools," Pearson Education, Inc., 1986, 796 pages.
Shawn A. Bohner et al., "Software Change Impact Analysis," IEEE Computer Society Press, 1996, 367 pages.

* cited by examiner

AUTOMATED PARALLEL SOFTWARE CODE IMPACT ANALYSIS

RELATED APPLICATION

This application is a continuation of U.S. patent application Ser. No. 12/914,532, filed Oct. 28, 2010, the disclosure of which is incorporated herein by reference.

BACKGROUND

Large software applications, that include many (e.g., hundreds, thousands, etc.) of lines of code, are usually developed iteratively and over time as new features and/or functionality are added to the applications as a result of customer feedback, as a result of changes in technology, and/or as new innovations are discovered. The new features and/or functionality are usually incorporated by making changes to the existing code (e.g., by deleting lines, editing existing lines, or adding new lines). Unfortunately, changes to the existing code may introduce bugs that can degrade the performance of the applications or cause the applications to not function properly. Additionally, changes made to a particular portion of the code may affect other parts of the code in ways that were not anticipated by the software developers when the changes were made, which may degrade the performance and/or functionality of the application.

To ensure that the changes made to the code result in the desired performance and/or functionality, the software developers usually perform complex testing operations to identify bugs and/or other conditions associated with the changes to the code. Unfortunately, the testing operations are often time consuming and/or expensive, which may cause the release of the new features and/or functionality to be delayed and/or the cost of the applications to increase.

SUMMARY

According to one aspect, a method may include receiving, by a server device, a request to perform a parallel impact analysis on a changed line of code, of a group of lines of code, associated with a software application and generating, by the server device and in response to the request, a control flow graph that corresponds to a function associated with one or more of the group of lines of code, the one or more of the group of lines of code including the changed line of code, where the control flow graph may include a set of blocks that correspond to the one or more of the group of lines of code, the set of blocks including an epicenter block associated with the changed line of code. The method may also include traversing, by the server device, the set of blocks to determine whether any of the set of blocks are affected by a set of variables within the epicenter block; identifying, by the server device and based on the traversing, at least one impacted block, of the set of blocks, that is affected by the set of variables and one or more statements, associated with the at least one impacted block, that call one or more other functions; generating, by the server device, other control flow graphs for the one or more functions, where each of the other control flow graphs may include a different set of blocks that correspond to a respective, different one or more of the group of lines of code; traversing, by the server device, the different set of blocks associated with each of the other control flow graphs to identify at least one other impacted block that is affected by the set of variables; and presenting, by the server device and to a display device, identifiers associated with the at least one impacted block and the at least one other impacted block for display, where the identifiers may permit the software application to be tested based on the at least one impacted block and the at least one other impacted block.

According to another aspect, a server device may include a processor to receive a request to identify a manner in which a changed line of code affects a group of lines of code associated with a software application; generate a set of blocks that correspond to one or more of the group of lines of code associated with a parent function, where the parent function is associated with an act or operation performed by the software application and which includes the changed line of code; and perform, in response to the request, an intra-procedural analysis on the set of blocks to identify at least one block, of the set of blocks, that is affected by the changed line of code included within an epicenter block, of the set of blocks. The processor may also perform an inter-procedural analysis on one or more functions associated with the at least one block, where, when performing the inter-procedural analysis, the processor is to generate another set of blocks associated with the one or more functions, and identify at least one other block, of the other set of blocks, that is affected by the changed line of code included within the epicenter block; and present, for display on a display device, information associated with the at least one block or the at least one other block that enables the software application to be tested based on the at least one block or the at least one other block.

According to yet another aspect, a non-transitory computer-readable medium may include receiving a request to perform an impact analysis on a changed line of code, of a group of lines of code, associated with a software application; associating, in response to the request, a parent function with one or more lines of code, of the group of lines of code, that include the changed line of code; generating a control flow graph associated with the parent function, where the control flow graph includes a set of blocks that correspond to the one or more lines of code and an epicenter block that corresponds to the changed line of code, where the epicenter block may include a set of variables that are defined within the epicenter block; and identifying one of the set of blocks, as an impacted block, when the one of the set of block uses any of the set of variables. The non-transitory computer-readable medium may also include generating a call graph that identifies one or more child functions associated with the impacted block based on statements, within the impacted block, that logically interconnect the one or more child functions with the impacted block; identifying at least one other impacted block, of the blocks associated with the one or more child functions, based on a determination that the at least one other impacted block uses any of the set of variables; and presenting, for display, a notification that software testing is to be conducted on lines of code associated with the impacted block and the at least one other impacted block.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

An implementation, described herein, may include systems and/or methods for automatically performing a parallel impact analysis of changes made to a software code. An impact analysis (IA) application may automatically perform a parallel impact analysis on the software code by identifying the manner in which changes made to individual lines of code affect portions of the code that are adjacent to the individual lines of code and/or other portions of the code that are not adjacent to and/or are remote from the individual lines of code. The IA application may perform the parallel impact analysis in a manner that enables software developers to identify and/or perform particular tests to verify proper functionality of the code as a result of the changes. Alternatively, or additionally, identification of the particular tests, as a result of the parallel impact analysis, may reduce the quantity, the complexity, and/or the cost of the testing that would otherwise have been performed had the parallel impact analysis not been performed.

As described herein, the IA application may performed the parallel impact analysis by concurrently and/or simultaneously evaluating affects caused by changes to individual lines of code based on an intra-procedural analysis and/or an inter-procedural analysis. The intra-procedural analysis may correspond to evaluating affects caused by changes to one or more lines of code that corresponds to a function (e.g., a parent function) within the software code. The inter-procedural analysis may correspond to evaluating the affects and the manner in which the affects propagate to other functions (e.g., functions adjacent to a parent function and/or remote from the parent function) that are caused by changes to the parent function.

Figure 1:
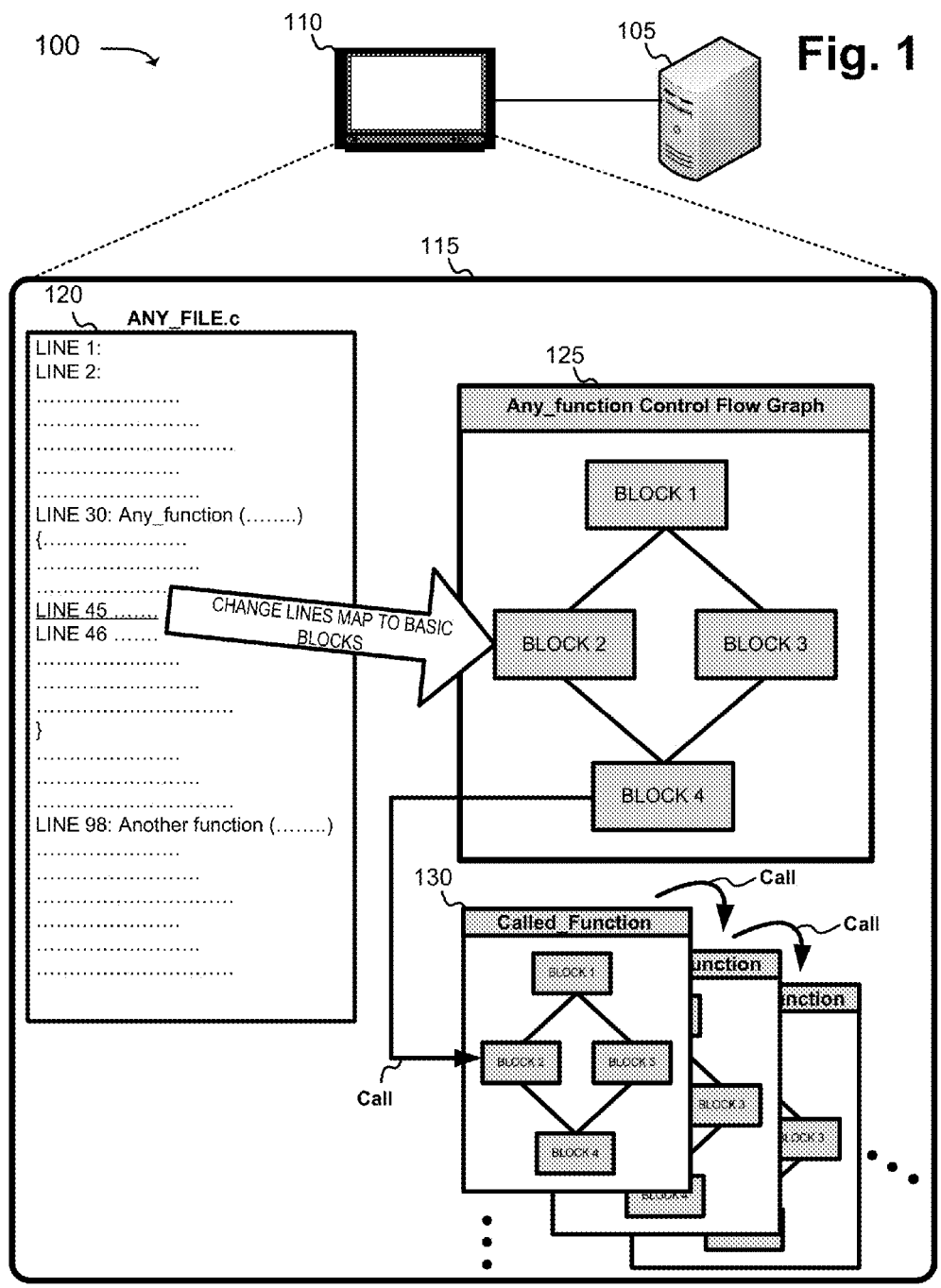
FIG. 1 is a diagram of an overview of an automated parallel software code impact analysis implementation described herein.

FIG. 1 is a diagram of an overview of an automated parallel software code impact analysis implementation described herein. As illustrated in FIG. 1, a system (e.g., system 100) may include an application server 105 that is interconnected to a display device 110. The number of devices, illustrated in FIG. 1, is provided for explanatory purposes only. In practice, there may be additional devices, fewer devices, different devices, or differently arranged devices than illustrated in FIG. 1. Also, in some implementations, one or more of the devices depicted in FIG. 1 may perform one or more functions described as being performed by another one or more of the devices of FIG. 1. For example, application server 105 and/or display device 110 could be integrated into a single device, such as a lap top computer, etc. that performs all or some of the functions described below as being performed by an individual one of these devices. Alternatively, application server 105 (or display device 110) may be implemented as multiple, possibly distributed, devices. Devices of system 100 may interconnect via wired connections, wireless connections, or a combination of wired and wireless connections.

Application server 105 may include one or more server devices (e.g., a personal computer, a laptop, a server device, a wireless device, such as a mobile phone or a personal digital assistant (PDA), or the like), or other types of computation or communication devices, that gather, process, search, store, and/or provide information in a manner similar to that described herein. In one example implementation, application server 105 may include logic and/or software associated with an IA application, which application server 105 may use to automatically perform a parallel impact analysis on changes made to code associated with a software application. The term "software application," as used herein, may be any type of computer program, which may include lines of code that, when executed by a device (e.g., application server 105), perform an act, an operation, a function, etc.

For example, application server 105 may perform a parallel impact analysis of changes made (e.g., by a software developer or team of software developers) to software code associated with a large application that includes many lines of code (e.g., more than 100 lines, 1000 lines, 10,000 lines, etc.). Application server 105 may present information associated with the impact analysis to display device 110 for display.

Display device 110 may include one or more devices that receive, process, and/or visually display information received from application server 105. In one example, application server 105 may render information associated with the parallel impact analysis, via a parallel impact analysis user interface (UI) (e.g., impact analysis UI 115), for display by display device 110.

Impact analysis UI 115 may, for example, include a code listing 120, a parent function control flow graph 125 (hereafter referred to as a "parent graph 125"), and one or more child function control flow graphs 130 (hereinafter collectively referred to as "child graphs 130" or individually as a "child graph 130"). Code listing 120 may include a listing of the lines of code associated with an application (e.g., an application called "Any_File.c") in which changes have been made. The changes to the lines of code may be identified within the listing, by an indicator that allows the changed lines of code to be visually and/or logically distinguished from other lines of code that have not been changed (e.g., by flagging, highlighting, underlining, bolding, etc., the changed lines of code; by indexing and/or storing an identifier associated with the changed lines of code, etc.).

Parent graph 125 may include blocks that logically correspond to a function within the application that includes a line of code that has been changed. The term "function," as used herein, may include a collection of lines of code that logically perform an operation, an act, and/or a task within the application.

In an example implementation, the IA application may perform an intra-procedural impact analysis on the application. For example, the IA application may identify a function (e.g., a parent function) that includes a line of code that has been changed and may generate a control flow graph (e.g., parent graph 125) associated with the function. The control flow graph may include one or more blocks (e.g., blocks 1-4) that correspond to all or a portion of the lines of code within the function, which do not include a jump in control flow. For example, the IA application may identify a change in a line of code (e.g., line 45) within a function (e.g., identified by line 30: Any_function) and may logically map (e.g., as identified by the arrow in FIG. 1) the change to a block (e.g., block 2) to which the changed line of code corresponds. The block to which the change has been mapped (sometimes referred to, herein, as an "epicenter block") may represent a unit of change within the software code. The IA application may trace a manner in which the change, associated with the epicenter block, propagates to other blocks within the function on which the epicenter block depends (e.g., block 1) and/or which depend on the epicenter block (e.g., block 4).

In another example implementation, the IA application may perform an inter-procedural impact analysis by tracing a manner in which the change in the function propagates to other functions that are called by the function (e.g., a called function) or which call the function (e.g., a caller function). For example, the IA application may determine that the function that includes an epicenter block (e.g., the parent function) calls another function (e.g., a called function that is sometimes referred to, herein, as a "child function"). In another example, the IA application may determine that the parent function is called by another function (e.g., a caller function that is also sometimes referred to, herein, as a "child function"). The IA application may identify the child functions and may perform an analysis, in a manner similar to that described above with respect to the intra-procedural analysis, on each of the child functions, which includes generating a control flow graph (e.g., child graph 130) for each of the child functions.

Alternatively, or additionally, the IA application may identify other functions that are called by (or that call on) the identified child functions and may continue to identify successive additional functions (e.g., sometimes referred to herein as grandchild functions, great grandchild functions, etc.) on which to generate control flow graphs for each of the additional functions until no other additional functions can be identified.

The IA application may use the intra-procedural analysis and/or the inter-procedural analysis to determine the change propagation within the software code. For example, the IA application may establish an analysis thread to identify other blocks within the parent function that are affected by the change included in the epicenter block. The IA application may mark affected blocks in the parent function as "impacted." The IA application may trace the change to one or more blocks within a child function (e.g., a child function that is called by a block in the parent function) that is affected by the change based on the analysis thread. The IA application may mark affected blocks in the child functions as "impacted." In another example, the IA application may establish another analysis thread associated with another child function, that is called by another block, in the parent function, affected by the change. The IA application may identify blocks within the other child function that are affected by the change and may trace the change to one or more blocks within a further child function called by a block, in the other child function, affected by the change. The IA application may mark affected blocks in the child functions as "impacted."

The IA application may generate analysis threads for other parent and/or child functions associated with the software code and may execute the analysis threads in a parallel manner (e.g., using hardware that is capable of parallel processing, such as a device with a multi-core processor) that permits portions of the software code (e.g., that correspond to each impacted block) to be traced and identified via the threads. The analysis threads may permit a testing operation to be performed in a manner that targets particular areas of the software code (e.g., desired by a software developer and/or software testing team) based on the results of the parallel impact analysis.

Figure 2:
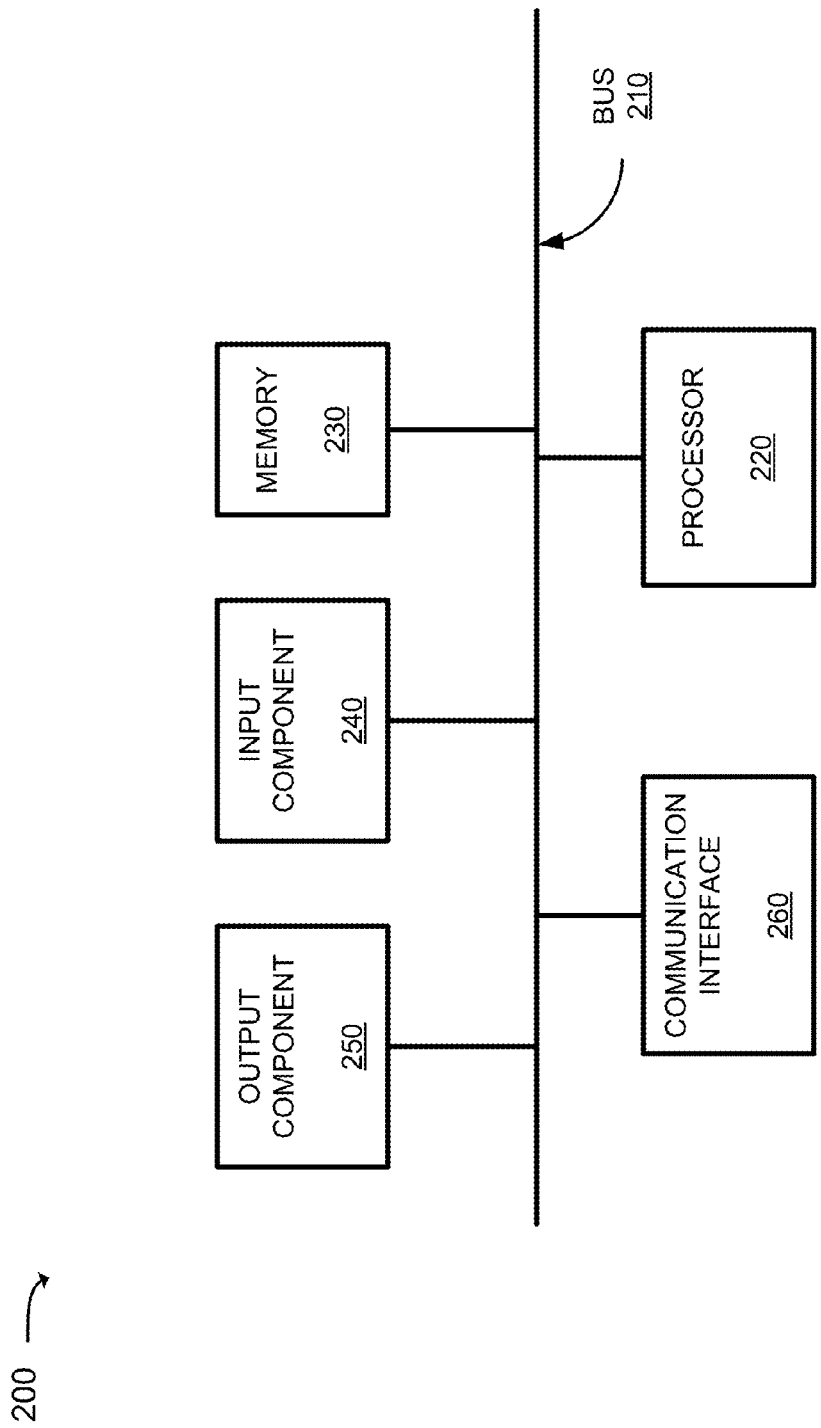
FIG. 2 is a diagram illustrating example components of a network device of FIG. 1.

FIG. 2 is a diagram illustrating example components of a device 200 of system 100. Device 200 may correspond to application server 105 of FIG. 1. Alternatively, application server 105 may include multiple devices 200. As shown in FIG. 2, device 200 may include a bus 210, a processor 220, a memory 230, an input component 240, an output component 250, and a communication interface 260.

Although FIG. 2 shows example components of device 200, in other implementations, device 200 may include fewer components, additional components, different components, or differently arranged components than depicted in FIG. 2. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic that interprets and executes instructions. Memory 230 may include any type of dynamic storage device that stores information and instructions, for execution by processor 220, and/or any type of non-volatile storage device that stores information for use by processor 220.

Input component 240 may include a mechanism that permits a user to input information to device 200, such as a keyboard, a keypad, a button, a switch, a microphone, a camera, a fingerprint reader, etc. Output component 250 may include a mechanism that outputs information to the user, such as a display, a speaker, one or more light emitting diodes (LEDs), a haptics-based device, etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 260 may include mechanisms for communicating with another device or system via a network.

As will be described in detail below, device 200 may perform certain operations relating to an automated parallel software code impact analysis. Device 200 may perform these operations in response to processor 220 executing software instructions contained in a computer-readable medium, such as memory 230. A computer-readable medium may be defined as non-transitory memory device. A memory device may include a space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
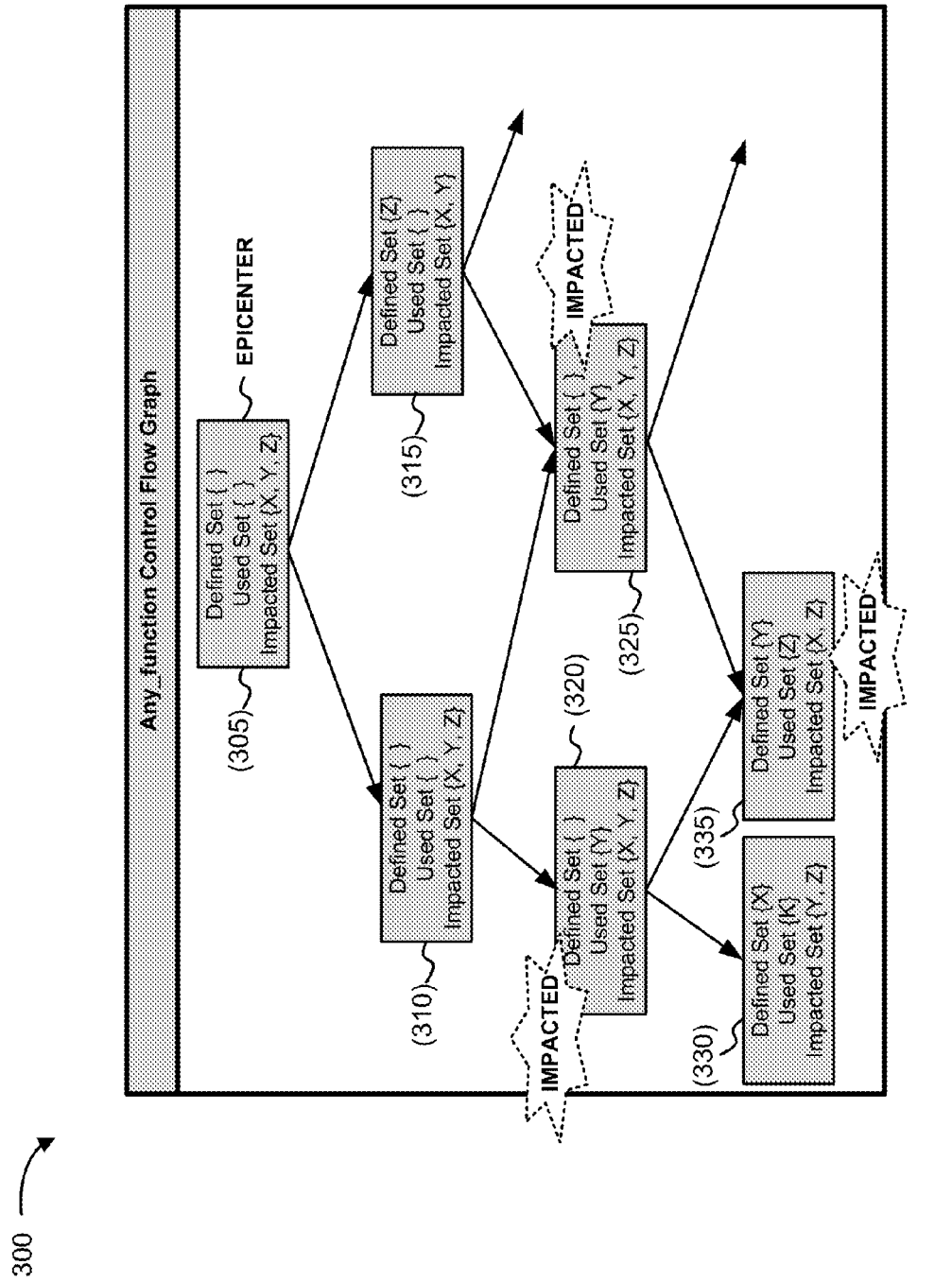
FIG. 3 is a diagram illustrating an example intra-procedural control flow graph associated with a function within a software application.

FIG. 3 is a diagram illustrating an example intra-procedural control flow graph 300 ("control flow graph 300") associated with a function within a software application. Control flow graph 300 may by rendered by the IA application, via impact analysis user interface 115, which the IA application may use to perform an intra-procedural analysis associated with a function (e.g., a parent function, a child function, etc.)

within a software code. For example, the IA application may generate control flow graph 300 that corresponds to a parent function that includes a changed line of code within the software application.

As illustrated in FIG. 3, control flow graph 300 may include a group of blocks 305-335 that correspond to lines of code included in the parent function. For example, each block may include one or more different lines of code associated with the parent function. Although FIG. 3 shows example blocks 300-335, of control flow graph 300, in other implementations, control flow graph 300 may include fewer blocks, additional blocks, different blocks, or differently arranged blocks than depicted in FIG. 3.

For example, the IA application may identify the data flow within the parent function by mapping the changed line of code to a corresponding block (e.g., block 305). Block 305 may, in this example, be identified as an epicenter block 305 because affects, caused by the changed line of code, on other lines of code (e.g., and/or corresponding blocks) originate and/or propagate from basic block 305. When mapping the changed line of code, the IA application may identify and/or associate variables included in the changed line of code and/or epicenter block 305 with particular variable sets. For example, a variable may be associated with a set of variables (e.g., an "impacted set" of variables) when the variable is defined in an epicenter block. A variable may be associated with another set of variables (e.g., a "defined set" of variables) when the variable is defined in a block that is not an epicenter block. A variable may be associated with a further set of variables (e.g., a "used set" of variables) when the variable is used in a block, but defined outside of the block.

For example, epicenter block 305 may correspond to lines of code (e.g., that includes the changed line of code) that defines variables (e.g., X, Y, and Z) and the IA application may associate the variables with an impacted set of variables (e.g., shown as impacted set {X, Y, Z}), when mapping the changed line of code to epicenter block 305. Additionally, or alternatively, the IA application may determine that there are no other variables within epicenter block 305 to associate with the defined and/or the used set of variables (e.g., shown as defined set { } and/or used set { }).

The IA application may identify and/or associate variables for other blocks (e.g., blocks 310-335). For example, the IA application may determine that block 310 includes the variables as defined in the epicenter block 305 (e.g., impacted set {X, Y, Z}) based on the logic and/or data flow of the code within the parent function. Additionally, or alternatively, the IA application may determine that block 310 does not include a defined and/or used set of variables. Block 315 may, for example, include a defined set of variables that includes a particular variable (e.g., Z) that was included in the impacted set. In this example, however, the code associated with block 315 may independently define (or redefine) the particular variable and the IA application may associate the particular variable with the defined set of variables (e.g., defined set {Z}). Because the particular variable is independently defined, any changes associated with the particular variable due to changes in the code associated with epicenter block 305 may not affect (e.g., and/or propagate to) the particular variable within block 315. Block 315 may include the other variables defined in epicenter block 305 (e.g., as impacted set {X, Y}) and may not include a used set of variables.

Blocks 320 and/or 325 may not, for example, include a defined set of variables and may include the impacted set of variables defined in epicenter block 305. In this example, however, the code associated with block 320 and/or 325 may use a particular variable (e.g., Y) that was defined in epicenter block 305 and the IA application may associate the particular variable with the used set of variables (e.g., used set {Y}). Because the particular variable was defined in epicenter block 305, any changes associated with the particular variable may affect (e.g., may propagate to) the particular variable in block 320 and/or 325. Block 320 and/or 325 may not include a defined set of variables.

Block 330 may include a defined set of variables (e.g., defined set {X}) that includes a particular variable (e.g., X) that was included in the impacted set. However, because the particular variable is independently defined in block 330, any changes associated with the particular variable in epicenter block 305 may not affect (e.g., may not propagate to) the particular variable within block 330. Block 330 may include a used set of variables (e.g., used set {K}), that includes a variable (e.g., K) that is defined elsewhere (e.g., outside block 330 and/or epicenter block 305). However, because the variable is not defined in epicenter block 305 (e.g., the variable is not included in impacted set {X, Y, Z}), any changes associated with epicenter block 305 may not affect the variable within block 330. Additionally, or alternatively, block 330 may include the other variables defined in epicenter block 305 (e.g., as impacted set {Y, Z}).

Block 335 may include a defined set of variables (e.g., defined set {Y}) that includes a particular variable (e.g., Y) that was included in the impacted set. However, because the particular variable is independently defined in block 335, any changes associated with the particular variable in epicenter block 305 may not affect (e.g., may not propagate to) the particular variable within block 335. Block 335 may include a used set of variables (e.g., used set {Z}), that includes a variable (e.g., Z) that was defined in epicenter block 305. Because the variable is defined in epicenter block 305, any changes within epicenter block 305 associated with the variable may affect the variable within block 335. Additionally, or alternatively, block 335 may include the other variables defined in epicenter block 305 (e.g., as impacted set {X, Z}).

The IA application may use control flow graph 300 to perform an intra-procedural impact analysis of the parent function to determine the impact propagation of the change associated with epicenter block 305 to the other blocks (e.g., blocks 310-335). For example, the IA application may establish an analysis thread in order to trace and/or traverse data flow paths between blocks within the parent function. The IA application may use the analysis thread to determine the manner in which variables within the impact set {X, Y, Z} associated the epicenter block 305 propagate to a another block. For example, the IA application may identify that block 310 does not use and/or depend on a variable (e.g., used set { }) that is included in the impacted set variables of the epicenter block 305, which may cause the IA application to determine that block 310 is not impacted by the change in the line of code.

In another example, the IA application may identify that block 320 uses and/or depends on a variable (e.g., used set {Y}) that is included in the impacted set of variables associated with epicenter block 305. Based on the identification, the IA application may determine that block is impacted (e.g., as shown by a star labeled as "impacted"). In yet another example, the IA application may identify that block 330 uses and/or depends on a variable (e.g., used set {K}) and may determine that the variable is not included in the impacted set of variables associated with epicenter block 305. Based on the determination, the IA application may determine that block 330 is not impacted by the change in the code. In still another example, the IA application may identify that block 335 uses and/or depends on a variable (e.g., used set {Z}) that is included in the impacted set of variables associated with epicenter block 305 and may determine that block 335 is impacted (e.g., as shown by a star labeled as "impacted").

The IA application may traverse other data flow paths (e.g., from epicenter block 305 to block 315, to block 325) within control flow graph 300 and may identify other blocks that are impacted by the change in the code. For example, in a manner similar to that described above, the IA application may identify other impacted blocks (e.g., block 325 as shown by a star labeled as "impacted"). The IA may mark each block that was identified as impacted (e.g., blocks 320, 325, and 335) while traversing the data flow paths as part of the intra-procedural impact analysis of the parent function. The marking may include setting a flag associated with the block and/or by storing an identifier associated with the impacted blocks in a data structure.

Figure 4:
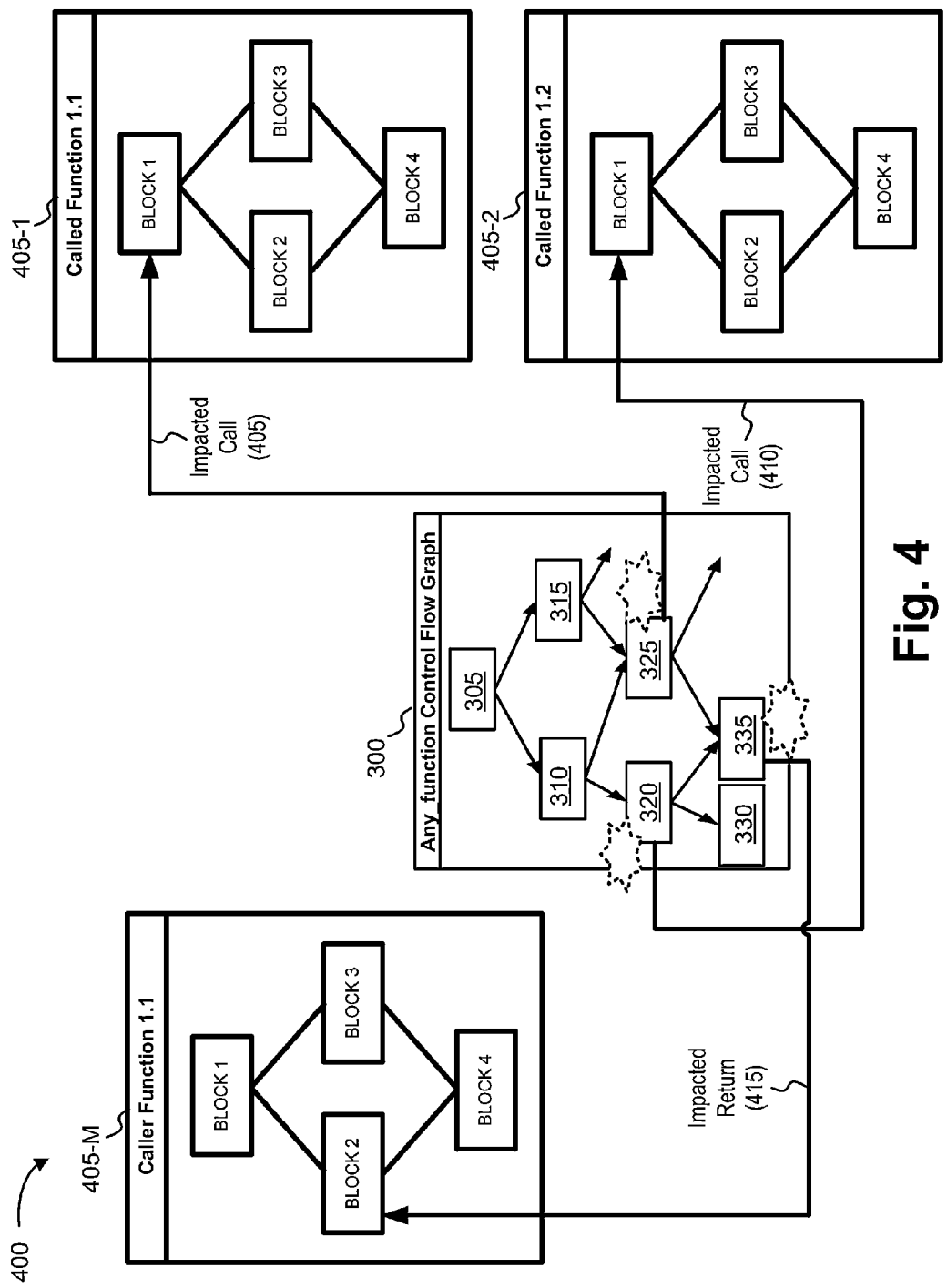
FIG. 4 is a diagram illustrating an example inter-procedural call graph.

FIG. 4 is a diagram illustrating an example inter-procedural call graph 400 (hereinafter referred to as "call graph 400"). Call graph 400 may by rendered by the IA application, via impact analysis user interface 115, which the IA application may use to perform an inter-procedural analysis associated with one or more functions that call another function (e.g., such as a parent function, identified as any_function) or that are called by the other function within the software code.

As illustrated in FIG. 4, call graph 400 may include control flow graph 300 as described above with respect to FIG. 3. Call graph 400 may also include a collection of control flow graphs 405-1, 405-2, ..., 405-M (where M≥1) (hereinafter referred to collectively as control flow graphs 405 and individually as "control flow graph 405"). Although call graph 400 shows example control flow graphs 405-1 through 405-M, in other implementations, call graph 400 may include fewer control flow graphs, additional control flow graphs, different control flow graphs, or differently arranged control flow graphs than depicted in FIG. 4.

Control flow graph 405 may be a control flow graph that is associated with a function (e.g., a child function, a grandchild function, etc.) that is called by another function (e.g., a parent function, etc.) or that calls the function. For example, during an intra-procedural impact analysis, the IA application may identify a call statement within the code associated with epicenter block 305 (FIG. 3) and/or an impacted block (e.g., blocks 320, 325, and/or 335 of FIG. 3) that calls a function (e.g., a child function that is a called function). The IA application may also identify a return statement that is a logical return to another function (e.g., a child function that is a caller function). Based on the identification of the child functions, the IA application may generate a call graph associated with the parent function and/or the child functions.

In one example, the IA application may generate control flow graph 405 for each child function (e.g., control flow graph 405-1 and/or 405-2) that is called by impacted blocks of the parent function. In another example, the IA application may generate control flow graph 405 for each child function (e.g., control flow graph 405-M) to which an impacted block includes a logical return. The IA application may generate control flow graph 405 for each of the child functions in a manner similar to that described above (e.g., with respect to control flow graph 300 of FIG. 3). For example, the IA application may create blocks corresponding to the lines of code associated with each child function. The IA application may establish logical links between the blocks based on the data flow within the child function. The IA application may generate call graph 400 based on control flow graph 300 associated with the parent function and control flow graphs 405 associated with the child functions. Alternatively, or additionally, the IA application may establish logical connections (e.g., shown as impacted call 405 and 410) between the impacted blocks within the parent function and blocks within the child functions that were called by the impacted blocks. The IA application may also establish logical connections (e.g., shown as impacted return 415) between the impacted block within the parent function and a block within the child function to which the return is being sent by the impacted block.

The IA application may use call graph 400 to perform the inter-procedural impact analysis. For example, the IA application may establish an analysis thread that includes performing an intra-procedural impact analysis of the parent function in a manner similar to that described above with respect to FIG. 3. Additionally, the IA application may establish a separate analysis thread associated with inter-procedural impact propagation from the parent function to child functions called by impacted blocks within the parent function. For example, the IA application may establish an analysis thread to traverse a data flow path (e.g., impacted call 405) based on a call statement from block 325 of the parent function to a block (e.g., block 1) within a called child function associated with control flow graph 405-1. The IA application may, for example, perform an intra-procedural analysis of the blocks, associated with the data flow to and/or from block 1, within the called child function in a manner similar to that described above with respect to FIG. 3. The IA application may mark the blocks, within the child function, that are impacted by the change associated with epicenter block 305. The IA application may establish other analysis threads associated with other call statements (e.g., impacted call 410) to other called child functions (e.g., associated with control flow graph 405-2).

In another example, the IA application may establish an analysis thread associated with inter-procedural impact propagation from the parent function to a child function that calls the parent function. For example, the IA application may establish an analysis thread to traverse a data flow path (e.g., impacted return 415) based on a return statement from block 335 of the parent function to a block (e.g., block 2) within a caller child function associated with control flow graph 405-M. The IA application may, for example, perform an intra-procedural analysis of the blocks, associated with the data flow to and/or from block 2, within the caller child function in a manner similar to that described above with respect to FIG. 3. The IA application may mark the blocks, within the child function, that are impacted by the change associated with epicenter block 305.

Figure 5:
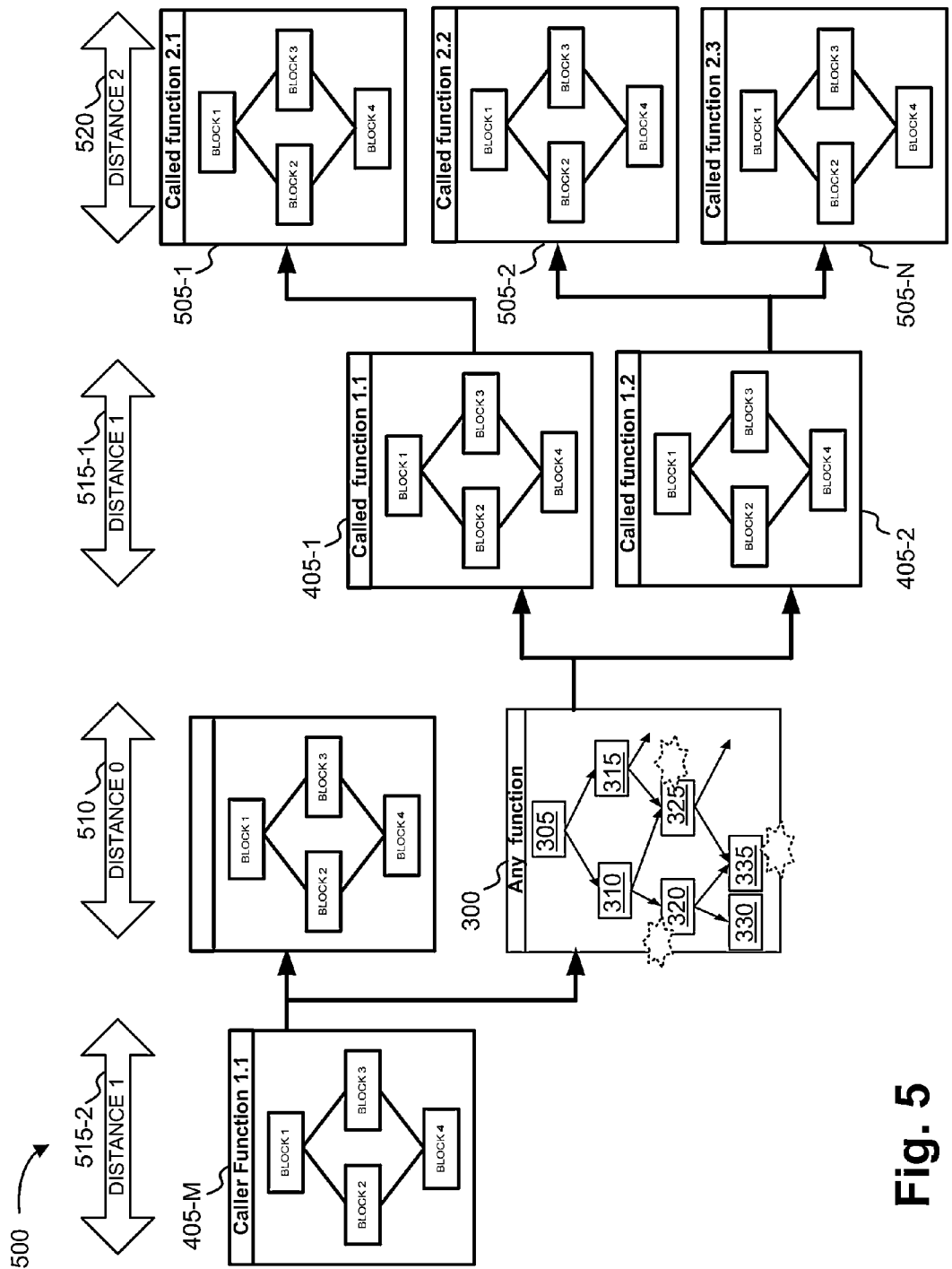
FIG. 5 is a diagram illustrating an example inter-procedural call graph associated with change propagation distance.

FIG. 5 is a diagram illustrating an example inter-procedural call graph 500 (hereinafter referred to as "call graph 500") associated with change propagation distance. For example, call graph 500 may include a control flow graph 300, associated with the parent function, logically interconnected with control flow graphs 405, associated with called and/or caller child functions, as illustrated in FIG. 4. Additionally, or alternatively, call graph 500 may include control flow graphs 505-1, 505-2, ..., 505-N (where N≥1) (hereinafter referred to collectively as "control flow graphs 505" and individually as "control flow graph 505"). Although call graph 500 shows example control flow graphs 505-1 through 505-N, in other implementations, call graph 500 may include fewer control flow graphs, additional control flow graphs, different control flow graphs, or differently arranged control flow graphs than depicted in FIG. 5.

Control flow graph 505 may be a control flow graph that is associated with a child function that is called by another child function or a child function that calls another child function. For example, the IA application may, in a manner similar to that described above (e.g., with respect to FIG. 4), identify other child functions (hereinafter referred to as "grandchild functions") as a result of an inter-procedural analysis associated with a parent function one or more child functions. More particularly, the IA application may identify call statements and/or return statements to grandchild functions while performing an intra-procedural impact analysis of each child function identified in the inter-procedural analysis. The IA application may generate control flow graph 505 for each of the grandchild functions and may, in a manner similar to that described above (e.g., with respect to FIG. 4) determine which blocks, associated with the grandchild functions, is impacted by the propagation of the change in epicenter block 305 (FIG. 3) of the parent function.

The IA application may determine a distance associated with a child, grandchild, and/or other functions relative to the parent function. For example, as shown in FIG. 5, the IA application may associate the parent function with a distance of zero (e.g., as shown by arrow 510). In another example, the IA application may associated child functions (e.g., associated with control flow graphs 405-1 through 405-M) with a distance of one (e.g., as shown by arrow 515-1 and/or 515-2). In yet another example, the IA application may associate grandchild functions (e.g., associated with control flow graphs 505-1 through 505-N) with a distance of two (e.g., as shown by arrow 520). The IA application may continue to perform inter-procedural impact analysis to identify additional layers of child functions (e.g., great grandchild functions, etc.) on which to identify impacted blocks until no call statements or return statements are identified. The IA application may mark the impacted blocks and may associate a distance with each of the additional layers of child functions.

Figure 6:
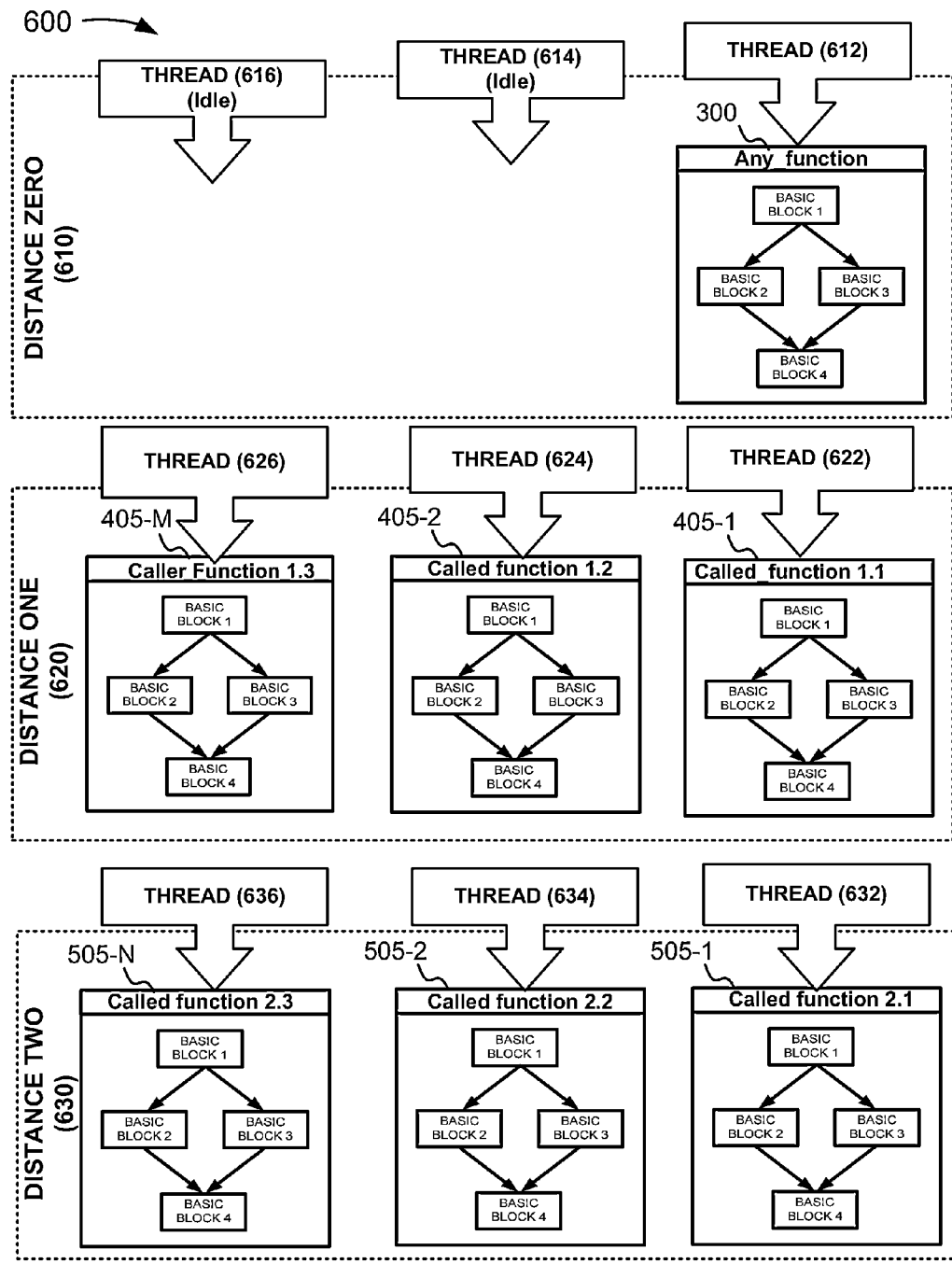
FIG. 6 is a diagram illustrating example parallel impact analysis threads based on intra-procedural and/or inter-procedural impact analysis.

FIG. 6 is a diagram illustrating example parallel impact analysis threads 600 based on intra-procedural and/or inter-procedural impact analysis. For example, the IA application may, in a manner similar to that described above (e.g., with respect to FIG. 3), generate a control flow graph (e.g., control flow graph 300) in order to determine the inter-dependencies of the blocks relative to epicenter block 305. As illustrated in FIG. 6, IA application may establish an analysis thread (e.g., analysis thread 612) associated with the parent function to perform an intra-procedural impact analysis to identify impacted blocks within control flow graph 300. In another example, the IA application may generate control flow graphs for other parent functions identified in the code and may establish other analysis threads (e.g., thread 614 and 616) to perform intra-procedural impact analyses on the other threads. Additionally, or alternatively, the IA application may execute the analysis threads associated with parent functions that correspond to the same distance (e.g., distance zero 610) in a concurrent and/or parallel manner, which may reduce the time associated with performing the analysis in a sequential manner. In this example, illustrated in FIG. 6, other threads (e.g., threads 614 and 616) may be idle when only one parent function has been identified.

Based on the intra-procedural impact analysis, the IA application may perform an inter-procedural analysis, in a manner similar to that described above (e.g., with respect to FIG. 4). For example, the IA application may identify child functions associated with a particular distance relative to the parent function (e.g., distance one 620) based on the call statements and/or return statements included within the impacted blocks of control flow graph 300. The IA application may generate control flow graphs (e.g., control flow graphs 405-1 through 405-M) for each child function in order to determine the data flow dependencies between blocks within the child functions. As illustrated in FIG. 6, IA application may establish parallel analysis threads (e.g., analysis threads 622-626) for each of the child functions associated with the particular distance in order to perform an intra-procedural impact analysis to identify impacted blocks associated with the child functions. For example, the IA application may execute the analysis threads associated with child functions in a concurrent and/or parallel manner, which may reduce the time associated with performing the analysis in a sequential manner.

The IA application may continue to identify functions (e.g., grandchild functions, great grandchild functions, etc.) at increasing distances relative to the parent function (e.g., distance two 630, distance three, and/or other distances) in a manner similar to that described above. The IA application may generate additional threads for each function associated with the inter-procedural impact analysis and may execute the threads in parallel, as described above. The quantity of blocks and/or functions associated with a software application to be analyzed may be scaled by adjusting a quantity of threads to be executed in parallel by the IA application. Executing the threads in parallel may be performed using multi-core processors associated with underlying hardware on which the IA application is executing. In one example, scaling up a quantity of blocks and/or functions to be analyzed may include increasing a quantity of parallel analysis threads to be executed and/or increasing a quantity of cores in a processor, or a quantity of separate processors, associated with the underlying hardware.

Figure 7:
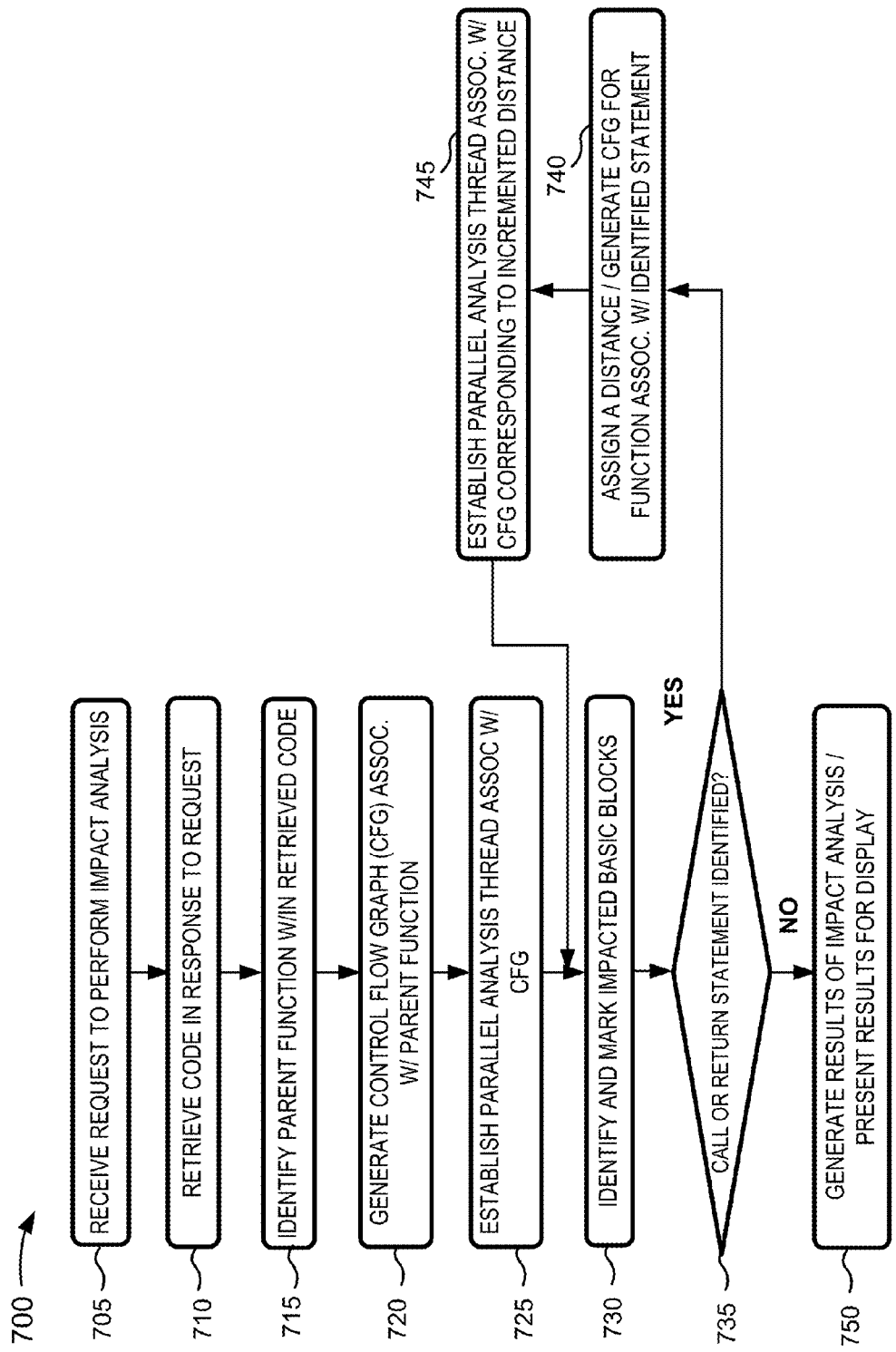
FIG. 7 is a flow chart illustrating an example process for performing an automated parallel software code impact analysis.

FIG. 7 is a flow chart illustrating an example process 700 for performing an automated parallel software code impact analysis. In one example implementation, process 700 may be performed by application server 105. In another example implementation, some or all of process 700 may be performed by another device or a group of devices separate from or including application server 105.

As shown in FIG. 7, process 700 may include receiving a request to perform a parallel impact analysis (block 705) and retrieving code in response to the request (block 710). For example, application server 105 may receive a request (e.g., from a user of application server 105) to perform a parallel impact analysis to identify the affects of changes made to code associated with a software application. In one example, the request may include a filename associated with a file that includes the changed version of the code and/or identifiers that permit the changes to the code to be identified by an IA application hosted by application server 105. Application server 105 may, in response to the request, retrieve the file from a memory (e.g., a memory associated with application server 105) based on the filename received in the request. In another example implementation, application server 105 may identify changes to the code in another way. For example, the IA application may, in response to the request, identify changes in the code by comparing a file of an original version of the code, with another file of an updated version of the code that includes one or more changes to the original version of the code. The IA application may identify a change to the code when a line of code in the updated version does not match a line of code in the original version.

As also shown in FIG. 7, process 700 may include identifying a parent function within the retrieved code (block 715). For example, the IA application may identify a parent function in the code that is associated with an identified change in a line of code. In one example, the IA application may identify the parent function based on a quantity of lines of code (e.g., that include the changed line of code) that perform an act, an operation, or a task within the software application. In another example, the IA application may identify the parent function associated with the changed line of code based on a line of code (e.g., that precedes the changed line of code) that identifies the beginning of the parent function (e.g., with an identifier, such as a name, a label, a symbol, etc. associated with the function) and another line of code (e.g., that follows the changed line of code) that defines an end to the parent function (e.g., with another identifier, such as "end," a symbol, a label, etc.). In another example implementation, the IA application may identify other parent functions, where each of the other parent functions correspond to a different changed line of code.

As further shown in FIG. 7, process 700 may include generating a control flow graph associated with a parent function (block 720). For example, the IA application may generate a control flow graph (e.g., control flow graph 300 of FIG. 3) by identifying blocks that are associated with the parent function. For example, in a manner similar to that described above (e.g., with respect to FIG. 3), the IA application may generate blocks that correspond to the lines of code within the parent function that define the data and/or logic flow within the function. The IA application may, for example, identify a portion of the lines of code within the parent function and may map the portion of the lines of code to a block. In another example, the IA application may map another portion of the lines of code within the parent function that includes the changed line of code to an epicenter block. The blocks may be logically interconnected based on the logic and/or data flow between the blocks. For example, the IA application may identify which variables are defined within the lines of code associated with the epicenter block (e.g., X, Y, Z) and may associate the defined variables with an impacted set of variables (e.g., impacted set $\{X, Y, Z\}$). The IA application may identify which variables are defined in other blocks and may associate the variables with a defined set of variables. The IA application may identify which variables are used in the other blocks and may associate the used variables with a used set of variables.

In another example implementation, the IA application may generate a control flow graph for each parent function identified in the code associated with the software application. The IA application may generate blocks and associated variables within the epicenter blocks and/or other blocks to impacted set, defined set, used set, and/or some other set of variables.

As yet further shown in FIG. 7, process 700 may include establishing a parallel analysis thread based on the control flow graph (block 725) and identifying and/or marking impacted blocks (block 730). For example, the IA application may establish an analysis thread associated with the control flow graph, which the IA application may use to perform an intra-procedural analysis of the parent function to identify the manner in which the changed line of code affects other blocks within the parent function. In one example, the IA application may determine that a block does not include any variables (e.g., X, Y, or Z) that are included in an impacted set of variables (e.g., impacted set $\{X, Y, Z\}$) associated with the epicenter block. Based on the determination that none of the variables in the impacted set are included the block, the IA application may determine that the block is independent of the epicenter block and, thus, is not an impacted block.

In another example, the IA application may determine that a particular variable (e.g., X), associated with a block, is included in the impacted set of variables, associated with the epicenter block. The IA application may also determine that the particular variable is defined (or redefined) in the block (e.g., and/or is included in a defined set $\{X\}$ associated with the block). Based on the determination that the particular variable is defined in the block, the IA application may determine that the block is not dependent on the epicenter block and, thus, is not an impacted block. In yet another example, the IA application may determine that a particular variable (e.g., Y), associated with another block, is included in the impacted set of variables associated with the epicenter block. The IA application may also determine that the particular variable is used in the other block (e.g., and/or is included in a used set $\{Y\}$ associated with the other block). Based on the determination that the particular variable is used in the other block, the IA application may determine that the other block is dependent on the epicenter block and may mark the other block as impacted.

In another example implementation, the IA application may establish other analysis threads (e.g., parallel analysis threads) associated with other control flow graphs that correspond to other parent functions identified within the code. The IA application may, for example, execute the other analysis threads in a parallel and/or concurrent manner, as described above (e.g., associated with distance zero 610 analysis threads with respect to FIG. 6). When executing the analysis threads associated with the other control flow graphs, the IA application may identify the manner in which the changes, associated with each of the epicenter blocks, propagate and/or impact other blocks associated with each of the epicenter blocks. The IA application may mark the impacted blocks and/or store an identifier associated with the impacted blocks in a memory associated with application server 105.

As still further shown in FIG. 7, if a call and/or return statement is identified (block 735—YES), the process 700 may include assigning a distance value and/or generating a control flow graph associated with an identified statement (block 740). For example, when executing an analysis thread associated with a control flow graph, the IA application may identify a call statement and/or a return statement within one or more impacted blocks. Based on the identification of the call and/or return statement, the IA application may perform an inter-procedural analysis to identify other functions (e.g., child function, grandchild functions, etc.) to which changes, associated with the epicenter block, may propagate.

For example, the IA application may traverse the call statement and/or the return statement to identify a function, which may depend on and/or be affected by the changes associated with the parent function. Based on the identification of the function, the IA application may, in a manner similar to that described above (e.g., with respect to block 720), generate a control flow graph by logically creating blocks and/or mapping portions of the code, associated with the function, to the blocks.

In another example implementation, the IA application may identify other call statements and/or return statements within impacted blocks associated with the parent function and may identify other functions that are dependent on and/or affected by the changes associated with the epicenter block. The IA application may, for example, generate a control flow graph for each of the other functions. When performing the inter-procedural analysis, the IA application may generate a call graph (e.g., call graph 500 of FIG. 5) that identifies interconnections between the parent function and the other functions. The IA application may assign a distance value to the other functions (e.g., a value of one, and/or some other value) relative to a distance associated with the parent function (e.g., a value of zero, and/or some other value).

As also shown in FIG. 7, process 700 may include establishing a parallel analysis thread associated with a control flow graph that corresponds to an assigned distance (block 745) and identifying and/or marking impacted blocks (block 730). For example, the IA application may establish parallel analysis threads associated with each of the control flow graphs that correspond to other functions and/or a particular distance (e.g., a distance of one). The IA application may, for example, execute the analysis threads in a parallel and/or concurrent manner, as described above (e.g., associated with distance zero 620 analysis threads with respect to FIG. 6). When executing the parallel analysis threads, the IA application may, in a manner similar to that described above (e.g., with respect to block 730), perform an intra-procedural analysis, for each control flow graph, to identify impacted blocks associated with the other functions. The IA application may mark the impacted blocks associated with each flow control graph and/or may store an identifier associated with each impacted block in a memory associated with application server 105.

As further shown in FIG. 7, if a call and/or return statement is not identified (block 735—NO), then process 700 may include generating results of an impact analysis and presenting the results for display (block 750). For example, when executing an analysis thread associated with a control flow graph, the IA application may not identify any impacted blocks. In another example, the IA application may not identify a call statement and/or return statement within an impacted block. Based on the determination, the IA application may determine that no other functions are affected by the changes to the code associated with the epicenter block. Alternatively, or additionally, the IA application may generate results of the parallel impact analysis based on the intra-procedural and/or inter-procedural analysis described above. For example, the IA application may generate a list of impacted blocks and/or functions to which the impacted blocks correspond. In another example, the IA application may identify a distance and/or level of the block and/or functions, relative to the parent function.

The IA application may present the results of the parallel impact analysis to display device 110 for display via impact analysis UI 115. For example, the IA application may present, for display on display device 110, a call graph (e.g., call graph 500 of FIG. 5) and/or one or more control flow graphs (e.g., control flow graph 300 of FIG. 3). In another example, the IA application may present the list of impacted functions and/or distances for display. A user of application server 105 (e.g., such as a software tester, a software test team, etc.) may use the results of the impact analysis to identify particular software tests to perform based on the impacted blocks, functions, etc. identified in the results of the impact analysis.

An implementation, described herein, may include systems and/or methods for automatically performing a parallel impact analysis of changes made to a software code. The systems and/or methods may automatically perform a parallel impact analysis on the software code by identifying the manner in which changes made to individual lines of code affect portions of the code that are adjacent to the individual lines of code and/or other portions of the code that are not adjacent to and/or are remote from the individual lines of code. The systems and/or methods may generate a control flow graph associated a parent function that includes a changed line of code. The systems and/or methods may use the control flow graph to perform an intra-procedural analysis that may correspond to evaluating affects caused by changes to one or more lines of code that corresponds to the parent function within the software code. The systems and/or methods may, as a result of the intra-procedural analysis, identify other functions that call the parent function or are called by the parent function. The systems and/or methods may create an analysis thread for each of the identified other functions and may perform an inter-procedural analysis that includes concurrently executing the analysis thread for each of the identified other functions to evaluate the affects and the manner in which the changed line of code propagates to the other functions. The systems and/or methods may present the results of the intra-procedural analysis and/or the inter-procedural analysis for display that permits portions of the software code, that are affected by the changed line of code, to be identified and tested.

The foregoing description provides illustration and description, but is not intended to be exhaustive or to limit the description to the precise form disclosed. Modifications and variations are possible in light of the above teachings or may be acquired from practice of the invention.

While a series of blocks has been described with regard to FIG. 7, the order of the blocks may be modified in other embodiments. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component or logic that performs one or more functions. A component or logic, as used herein, may include hardware, such as a processor, ASIC, or FPGA, or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    generating, by a device, a first control flow graph that corresponds to a first function associated with one or more of a plurality of lines of code,
        the one or more of the plurality of lines of code including a changed line of code,
        the first control flow graph including one or more blocks that correspond to the one or more of the plurality of lines of code, and
        the one or more blocks including a particular block associated with the changed line of code;
    identifying, by the device, at least one impacted block, of the one or more blocks, that is affected by a set of variables, within the particular block, that call a second function;
    generating, by the device, a second control flow graph for the second function, the second control flow graph including a different one or more blocks that correspond to different one or more of the plurality of lines of code;
detecting, by the device, a calling statement associated with a third function that is called by the first function;
assigning, by the device, a distance to the third function based on detecting the calling statement;
identifying, by the device and based on executing a plurality of analysis threads associated with the distance, at least one other impacted block, of the different one or more blocks, that is affected by the set of variables; and
providing, by the device and for display, identifiers associated with the at least one impacted block and the at least one other impacted block.

2. The method of claim 1, where identifying the at least one impacted block includes:
traversing the one or more blocks to identify the at least one impacted block.

3. The method of claim 1, where identifying the at least one other impacted block includes:
traversing the different one or more blocks to identify the at least one other impacted block.

4. The method of claim 1,
where generating the first control flow graph includes:
mapping a particular portion of the one or more of the plurality of lines of code to the particular block, and
where the particular portion of the one or more lines of code includes the changed line of code.

5. The method of claim 1, further comprising:
creating interconnections between the one or more blocks based on the first function.

6. The method of claim 1, where the set of variables is an impacted set of variables.

7. The method of claim 1, where assigning the distance comprises:
determining a return statement associated with the third function, and
assigning the distance to the third function based on detecting the calling statement and based on detecting the return statement.

8. A system comprising:
a server device, including a processor, to:
generate a first control flow graph that corresponds to a first function associated with one or more of a plurality of lines of code,
the one or more of the plurality of lines of code including a changed line of code,
the first control flow graph including one or more blocks that correspond to the one or more of the plurality of lines of code, and
the one or more blocks including a particular block associated with the changed line of code;
identify a first impacted block, of the one or more blocks, that is affected by a set of variables, within the particular block, that call a second function;
generate a second control flow graph for the second function,
the second control flow graph including a different one or more blocks that correspond to different one or more of the plurality of lines of code;
assign a distance to a third function that is called by or calls the first function;
execute a plurality of analysis threads, associated with the distance, to identify a second impacted block, of the different one or more blocks, that is affected by the set of variables; and
provide information associated with the first impacted block and the second impacted block.

9. The system of claim 8, where the server device is further to:
mark the first impacted block as having been affected by the changed line of code based on identifying the first impacted block.

10. The system of claim 8, where the server device is further to:
mark the second impacted block as having been affected by the changed line of code based on identifying the second impacted block.

11. The system of claim 8, further comprising:
perform an inter-procedural analysis based on the second impacted block and an interconnection associated with the second impacted block.

12. The system of claim 8, where, when generating the first control flow graph, the server device is to:
receive a request, and
generate the first control flow graph based on the request.

13. The system of claim 12, where the request is to perform a parallel impact analysis on the changed line of code.

14. The system of claim 8, where, when identifying the first impacted block, the server device is to:
determine that a variable, of the set of variables, is associated with a used set of variables that corresponds to the first impacted block, and
identify the first impacted block based on determining that the variable is associated with the used set of variables.

15. A non-transitory computer-readable medium storing instructions, the instructions comprising:
one or more instructions that, when executed by at least one processor, cause the at least one processor to:
generate a first control flow graph that corresponds to a first function associated with one or more of a plurality of lines of code,
the one or more of the plurality of lines of code including a changed line of code,
the first control flow graph including one or more blocks that correspond to the one or more of the plurality of lines of code, and
the one or more blocks including a particular block associated with the changed line of code;
identify a first impacted block, of the one or more blocks, that is affected by a set of variables, within the particular block, that call a second function;
generate a second control flow graph for the second function,
the second control flow graph including a different one or more blocks that correspond to different one or more of the plurality of lines of code;
identify a second impacted block, of the different one or more blocks, that is affected by the set of variables;
identify a third function based on a statement detected within the second impacted block;
assign a distance to the third function;
identify a third impacted block based on the distance; and
provide information associated with the first impacted block, the second impacted block, and the third impacted block.

16. The non-transitory computer-readable medium of claim 15, where the one or more instructions to generate the first control flow graph include:
one or more instructions that, when executed by the at least one processor, cause the at least one processor to:

receive a request to perform a parallel impact analysis on the changed line of code, and generate the first control flow graph based on the request.

17. The non-transitory computer-readable medium of claim 15, where the instructions further comprise:

one or more instructions that, when executed by the at least one processor, cause the at least one processor to:

mark the first impacted block, and generate the information associated with the first impacted block and the second impacted block based on marking the first impacted block.

18. The non-transitory computer-readable medium of claim 15, where the one or more instructions to identify the third impacted block comprise:

one or more instructions that, when executed by the at least one processor, cause the at least one processor to:

identify a plurality of analysis threads associated with the distance, and identify the third impacted block by executing the plurality of analysis threads.

19. The non-transitory computer-readable medium of claim 15, where the one or more instructions to identify the first impacted block comprise:

one or more instructions that, when executed by the at least one processor, cause the at least one processor to:

traverse the one or more blocks to identify the at least one impacted block.

20. The non-transitory computer-readable medium of claim 15, where the one or more instructions to generate the first control flow graph comprise:

one or more instructions that, when executed by the at least one processor, cause the at least one processor to:

map a particular portion of the one or more of the plurality of lines of code to the particular block, and where the particular portion of the one or more lines of code includes the changed line of code.

* * * * *